(12) United States Patent
Miles et al.

(10) Patent No.: US 7,987,508 B2
(45) Date of Patent: Jul. 26, 2011

(54) COPY PROTECTION SYSTEM FOR DATA CARRIERS

(75) Inventors: Anthony Miles, Bridgend (GB); Iain Benson, Bridgend (GB); Ceri Coburn, Bridgend (GB); Ian Davies, Rhiwbina (GB)

(73) Assignee: First 4 Internet Ltd., Banbury, Oxon (GB)

( * ) Notice: Subject to any disclaimer, the term of this patent is extended or adjusted under 35 U.S.C. 154(b) by 1226 days.

(21) Appl. No.: 10/560,316

(22) PCT Filed: Jun. 9, 2004

(86) PCT No.: PCT/GB2004/002433
§ 371 (c)(1),
(2), (4) Date: May 2, 2006

(87) PCT Pub. No.: WO2004/109681
PCT Pub. Date: Dec. 16, 2004

(65) Prior Publication Data
US 2006/0280050 A1 Dec. 14, 2006

(30) Foreign Application Priority Data
Jun. 9, 2003 (GB) .................................. 0313240.4

(51) Int. Cl.
*G06F 17/30* (2006.01)
*G11B 21/08* (2006.01)
*G11B 7/007* (2006.01)
*G06F 7/16* (2006.01)

(52) U.S. Cl. ...................................... 726/26; 369/30.05

(58) Field of Classification Search .................... 726/26; 369/30.05
See application file for complete search history.

(56) References Cited

U.S. PATENT DOCUMENTS
5,930,209 A 7/1999 Spitzenberger et al.
(Continued)

FOREIGN PATENT DOCUMENTS
GB 2 344 925 A1 6/2000
(Continued)

OTHER PUBLICATIONS
"Super Video CD SVCD System Specification" SVCD System Specification, XX, XX, Nov. 1998, pp. 1-86, XP001150484.
(Continued)

*Primary Examiner* — Michael J Simitoski
(74) *Attorney, Agent, or Firm* — Banner & Witcoff, Ltd.

(57) ABSTRACT

A copy-protected compact disc includes, within a single session, a table of contents (TOC) and a Video CD index (VI). Each track (T) is prefaced by unrecoverable data (UD) at a track start position (ATOC) indicated by the table of contents (TOC). However, the Video CD index (VI) indicates the actual position (AP) of the tracks. DVD players use the Video CD index (VI) to locate the tracks, while CD-ROM drives use the table of contents (TOC) and read the unrecoverable data (UD), which prevents them from reading the subsequent track (T). The unrecoverable data (UD) may be prefaced by data pointers (DP) which cause the CD-ROM drive to load a player program in response to the error condition. The player program can be used to play the tracks (T), but restricts copying. Subchannel data (P; DX) causes audio CD players to ignore the Video CD index (VI) and the unrecoverable data (UD), and to play the tracks (T) at their actual start positions (AP).

38 Claims, 4 Drawing Sheets

U.S. PATENT DOCUMENTS

| | | | |
|---|---|---|---|
| 6,047,292 A | 4/2000 | Kelly et al. | |
| 6,072,759 A * | 6/2000 | Maeda et al. | 369/59.25 |
| 6,988,206 B1 * | 1/2006 | Alcalay et al. | 369/275.5 |
| 7,196,976 B2 * | 3/2007 | Mons | 369/30.04 |
| 2002/0141741 A1 | 10/2002 | Zou et al. | |
| 2002/0159591 A1 * | 10/2002 | Heylen et al. | 380/201 |
| 2002/0162058 A1 * | 10/2002 | Sinquin et al. | 714/699 |
| 2003/0099354 A1 * | 5/2003 | Shavit et al. | 380/201 |
| 2003/0133386 A1 * | 7/2003 | Hahn | 369/59.25 |
| 2003/0185130 A1 * | 10/2003 | Kamperman et al. | 369/59.25 |
| 2004/0103115 A1 * | 5/2004 | Vandewater et al. | 707/104.1 |
| 2004/0109393 A1 * | 6/2004 | Hahn | 369/30.07 |

FOREIGN PATENT DOCUMENTS

| | | |
|---|---|---|
| GB | 2 386 245 A1 | 9/2003 |
| GB | 2 390 735 A1 | 1/2004 |
| WO | WO 01/46952 A | 6/2001 |
| WO | WO 01/61695 A | 8/2001 |
| WO | WO 01/80546 A | 10/2001 |
| WO | 02/075735 A1 | 9/2002 |
| WO | 03/034424 A2 | 4/2003 |
| WO | WO 03/038572 A | 5/2003 |

OTHER PUBLICATIONS

Volpe Francesco P. et al.: "Die Un-CDs, So Arbeiten Abspielsperren Fuer Audio-Cds" CT Magazin Fuer Computer Technik, Verlag Heinz Heise GMBH., Hannover, DE, vol. 7, 2003, pp. 144-149, XP002244753, ISSN:0724-8679 (See treatment in ISR submitted Dec. 9, 2005).

"Cactus Data Shield 200" Internet, Jan. 26, 2002, XP002261887.

"Super Video CD SVCD System Specification" SVCD System Specification, XX, XX, Nov. 1998, pp. 1-86, XP001150484.

Volpe Francesco P et al: "Die Un-CDs, So Arbeiten Abspielsperren Fuer Audio-Cds" CT Magazin Fuer Computer Technik, Verlag Heinz Heise GMBH., Hannover, DE, vol. 7, 2003, pp. 144-149, XP002244753, ISSN:0724-8679.

"Cactus Data Shield 200" Internet, Jan. 26, 2002, XP002261887.

* cited by examiner

COPY PROTECTION SYSTEM FOR DATA CARRIERS

FIELD OF THE INVENTION

This invention concerns methods, software and formats for preventing or restricting copying of data, particularly as recorded in digital form on a carrier such as optical disc media. In this description optical disc media is intended to include compact discs (CDs), CD-ROMs and Digital Versatile Discs (DVDs), as well as similar media that may be read using electromagnetic radiation outside the visible range.

BACKGROUND OF THE INVENTION

CD audio discs contain at least a first session formatted in compliance with the well known 'Red Book', also known as Standard 908 of the International Electrotechnical Commission (IEC) entitled 'Compact Disc Digital Audio System' (Geneva, Switzerland, 1987).

CD-ROMs contain one or more sessions formatted in compliance with the 'Yellow Book' standard and normally its extension 'System Description CD-ROM XA', which includes a data retrieval structure based on ISO 9660. The 'Yellow Book' standard incorporates the 'Red Book' standard, so that CD data drives can play audio data as well as read non-audio data. Multisession CD-R and CD-RW discs comply with the Orange Book standard.

In this specification, a distinction will be made between 'audio CD players', which need only be able to read CDs complying with the Red Book standard, and 'CD-ROM drives', which are able to read CD's complying with the Yellow Book standards, and normally the Orange Book standard as well. Audio CD players are generally stand-alone devices having no other functionality than audio reproduction, although they may be integrated with other devices. CD-ROM drives are peripherals for general-purpose computers or other similar devices which are able to load and run application programs selected by the user.

The advent of recordable CDs (CD-R) has made it generally easy and inexpensive to make unauthorised copies of audio CDs and CD-ROMs; for example by copying the entire contents of an audio CD to a computer hard disc and then writing this to a CD-R. The potential loss of revenue to recording companies from such activities is considerable, and indeed its impact has already been felt. Consequently, there is a need to prevent such unauthorised copying.

Red Book compliant CDs contain a great deal of information which is not necessary purely for playing audio tracks and which is ignored by most audio-only players. Hence, one approach to preventing unauthorised copying has been to deviate from Red Book compliance in a way that is ignored by audio CD players, but causes an error in a CD-ROM drive.

Examples of this approach are described in WO 00/74053, in which selected control data is rendered inaccurate or incorrect; the Table of Contents (TOC) may identify the audio tracks as data tracks, or may incorrectly identify the position of the Lead-Out. WO 02/075735 discloses identifying the first session as CD-ROM data when it actually contains audio tracks. EP 1239472 also discloses the idea of identifying audio tracks as data tracks in the TOC.

The techniques mentioned above are intended to prevent reading of audio tracks by a CD-ROM drive, and thereby prevent storage of the tracks on a computer and subsequent recording or distribution on some other medium. However, some users would like to play audio CDs on their computers. Hence, there is also a need to provide audio tracks in such a way that they can be played on a CD-ROM drive but cannot be re-recorded or distributed.

One solution to this problem has been to provide the audio tracks in a first session which cannot be read by a CD-ROM drive, and to provide an encrypted version of the audio tracks in a second session. The encrypted tracks can only be decrypted and played by a player program which plays the audio data by converting it to audio signals.

However, certain multifunction devices such as DVD players also conform to the Yellow Book standard and are therefore prevented from reading the audio tracks. Furthermore, multifunction devices may not be capable of loading and running a player program to decrypt and read a second session. Hence, a multifunction device such as a DVD player may not be able to reproduce any of the content of a copy-protected CD, despite being incapable of producing unauthorised copies. This problem is not unique to DVD players. For example, MP3-enabled CD players, automotive audio systems where the CD player is used to read mapping information for a navigation system as well as to play audio CDs, and games consoles may all be sensitive to modified control data in the first session, but incapable of running a player program to decrypt a second session. The sensitivity to modified control data in the first session depends on whether a suitable recovery strategy is programmed into the firmware of the device. Multifunction devices which are not general-purpose computers are normally not reprogrammable, but contain all of the necessary programs in firmware, and cannot therefore load a new player program for playing the second session.

Another problem is that the second session occupies a significant proportion of the CD, and yet typically contains duplicate content to the first session. Hence, the use of a second session restricts the quantity of content which can be recorded on a single CD.

STATEMENT OF THE INVENTION

According to one aspect of the present invention, a compact disc includes, within a single session, different indexes each recognisable by a different class of compact disc player. One index gives the start addresses of the payloads of tracks, and allows the class of player which reads that index to play the tracks. That class may be Video CD compatible players. A second index gives addresses for encapsulating data which prefaces some or all the tracks, leading a second class of player to read the encapsulating data instead of the tracks. The encapsulating data causes the second class of player to start a player program which allows playback but not copying of the tracks. The second class may be CD-ROM drives. The encapsulating data and the other index are recorded in such a way that a third class of player ignores them, and plays the tracks. The third class may be audio CD players.

Thus, a single session may contain tracks which are readable by each of the three different classes of CD player, but restricts copying of the tracks by the second class of player, which is otherwise able to copy the tracks.

According to another aspect of the present invention, there is provided a method of preventing access to a removable storage medium, such as a CD or DVD, by unauthorised applications, comprising intercepting commands sent through an application program interface to the drive, preventing normal operation of standard commands, and enabling operation of non-standard commands by converting non-standard commands to standard commands and sending them to the drive. Unauthorised programs do not normally generate non-standard commands, and are therefore prevented from controlling the drive, while authorised programs use non-standard commands to control the drive. This aspect of the invention provides a convenient way of distinguishing between authorised and unauthorised programs.

The present invention extends to a method of recording the compact disc, a computer program for performing the method, and the data structure of the compact disc.

BRIEF DESCRIPTION OF THE DRAWINGS

A detailed description of the preferred embodiments will now be described with reference to the accompanying drawings, in which.

DESCRIPTION OF THE EMBODIMENTS

Multiple File Systems in Single Session

In an embodiment of the invention, a compact disc (CD) carries a single session incorporating multiple data structures each complying with a filing system of a different standard. In this embodiment, the single session includes multiple different data structures readable by PC-compatible computers, Mac™ computers, Red Book standard audio CD players, and White Book standard video CD players. The track format is compatible with the relevant standard for that track type. In this way, a player can recognise one of the data structures in order to access the tracks, and can play the tracks if it is able to decode their format. However, the data structures readable by PC-compatible and Mac™ computers include unrecoverable data, which prevent the computer from reading the tracks unless by means of a dedicated player program which prevents unauthorised copying of the tracks.

Figure 1:
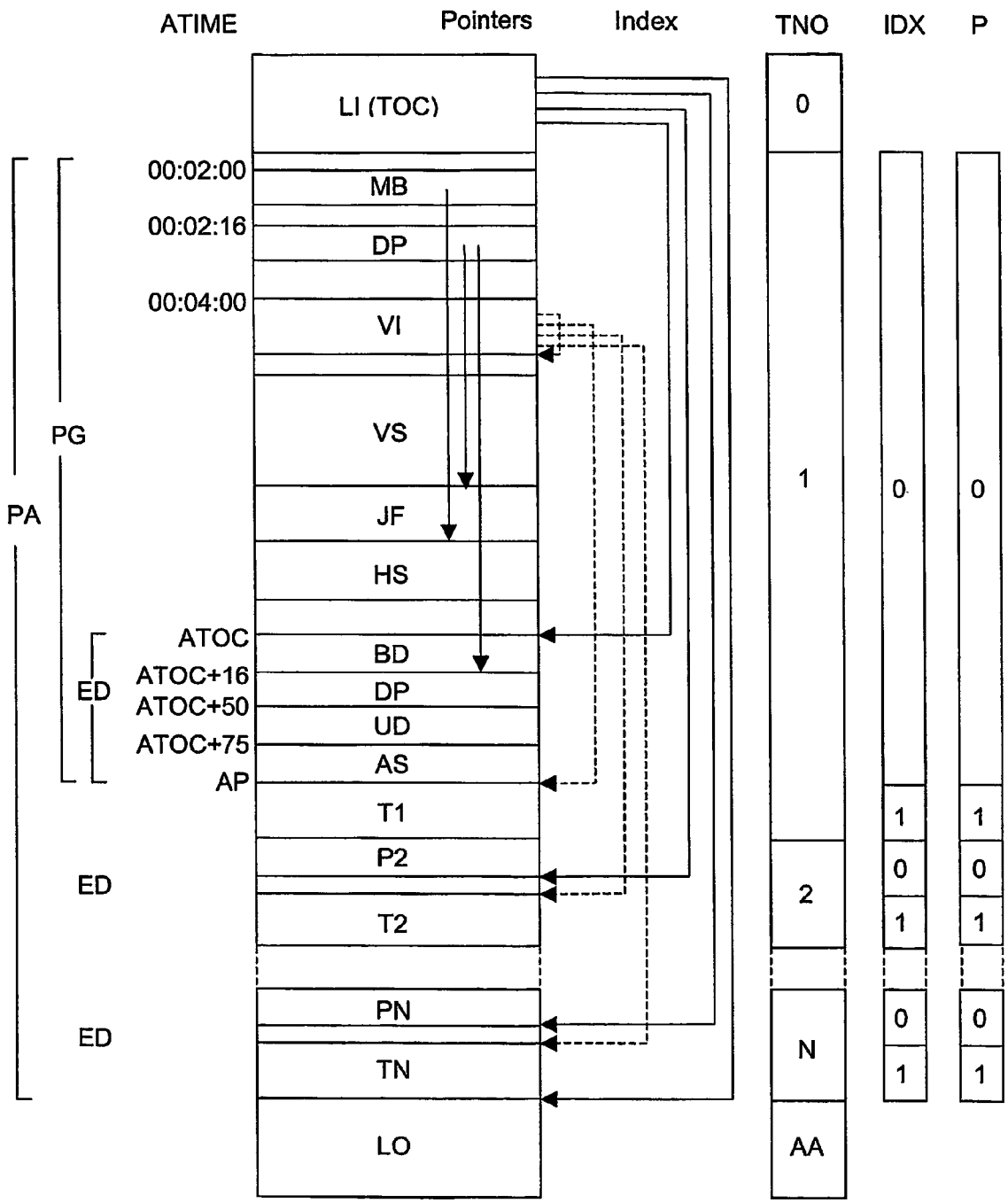
FIG. 1 is a diagram of a session format in an embodiment of the invention.

FIG. 1 shows a sample format of a single session in an embodiment of the invention. The single session contains a lead-in LI, a program area PA containing one or more tracks T1-TN, and a lead-out LO. The lead-in LI includes a table of contents (TOC), identifying the absolute times (ATIME) of the start of each track and of the lead-out LO.

The tracks T1-TN conform to the Red, Yellow and White Book standards as appropriate to each track. These formats are well known, but the relevant parts are recited here for ease of understanding. Each frame of data which is modulated and recorded on the CD includes one subcode byte. Each bit of the subcode byte corresponds to a different subcode channel, labelled from P to W. The P-channel is a single bit that goes high during an optional pause between tracks and goes low during the track. The Q-channel contains time codes, track type and catalogue information and, in the Lead-in, the TOC. The time codes include ATIME, the absolute time elapsed since the start of the session in the format M:S:F denoting minutes, seconds and frames. The Q channel also indicates the track number TNO, which increments during the pause preceding a track, and the index IDX which changes from '00' indicating a pause to '01' indicating a track.

As shown in FIG. 1, there is an extended pre-gap area PG containing multiple different data structures preceding the first track T1. The first data structure is a Mac™ boot sector MB containing a pointer to an HFS sector HS containing a Mac™ compatible player application, as described below. Thus, a Mac™ class computer, on mounting the CD, will load and run the Mac™ compatible player application.

Next, there are recorded data pointers DP required by the ISO 9660 standard: the Primary Volume Descriptor (PVD), Supplementary Volume Descriptor (SVD), and Volume Set Descriptor (VSD). The data pointers DP point to ISO 9660/Joliet files JF, containing a PC-compatible player application, as described below, and to duplicate data pointers DP preceding unrecoverable data UD as will be described below under the heading 'Data Encapsulation'.

Next, there is recorded a Video CD index section VI containing the files 'info.vcd' and 'entries.vcd', recorded at ATIME of respectively 00:04:00 and 00:04:01. According to the White Book standard, this section VI would normally be included in a segment play area of the disc, but in this embodiment, it is included in the extended pre-gap area PG. As a result, the index section VI is ignored by CD audio players and is not visible in the ISO 9660 Joliet or HFS filing systems.

Most DVD players identify a VCD type disc by looking for the files 'info.vcd' and 'entries.vcd' at ATIME of respectively 00:04:00 and 00:04:01, and will therefore find these files at the expected position and disregard the ISO 9660 data structure. The VCD index section VI is not indexed in the HFS or Joliet filing systems, and will therefore not be found by PC-compatible and Mac™ class computers.

The file 'entries.vcd' comprises an index of the positions of tracks readable under the VCD format in the disc. The index includes the actual start positions AP of each of the tracks T1-TN, but may also include the positions of video segments VS stored within the pre-gap area PG. Hence, a DVD player is able to locate and play the tracks T1-TN, and any video segments VS. According to the White Book, audio tracks conforming to the Red Book standard can be played.

Data Encapsulation

Since the tracks T1-TN are recorded in standard formats, it is desirable to prevent unrestricted access to the tracks by PC-compatible and Mac™ class computers. This is achieved by a format which will be referred to as 'data encapsulation'. In outline, data encapsulation involves prefacing a track with unrecoverable data and a pointer to a player program which is able to ignore the unrecoverable data, but which restricts copying of the tracks T1-TN. The unrecoverable data and pointer are recorded in a format which is ignored by players which do not conform to the Yellow Book standard, such as audio CD players. Data encapsulation can be applied to some or all tracks in a session.

In this embodiment, data encapsulation is achieved as follows. Immediately preceding the first track T1, there is recorded encapsulating data ED. The absolute time position ATOC of first track T1, as indicated in the TOC, indicates the first sector of the encapsulating data ED. Therefore, Yellow Book standard drives will interpret the first Track T1 as beginning at ATOC, and will start to read the track from that point. The encapsulating data ED comprises, in sequence: blank data BD; the duplicate data pointers DP; unrecoverable data UD, and audio silence AS.

The unrecoverable data UD may be unrecoverable due to one or more of sync information, error detection code (EDC) or error correction code (ECC) being corrupted. Alternatively, an inconsistent value of ATIME may be written in each sector header, while the EDC and the ECC do not indicate any error in this value.

The encapsulating data ED is followed sequentially at an absolute time position AP by the first track T1, which conforms entirely with the appropriate standard for the relevant track type.

The P channel bit stays high at the position ATOC, but goes low at the position AP. At this point, the index IDX changes from 00 (indicating a pause) to 01 (indicating a track). Throughout the pre-gap area PG, the track number TNO indicates the track number of the following track (in this case, it has the value 1). As shown in FIG. 1, each of the subsequent tracks may be prefaced by the encapsulating data ED.

When an encapsulated track is played by a CD-ROM drive, the drive reads the position ATOC from the TOC and starts reading at that position. First, the duplicate data pointers DP are read; the duplicate data pointers DP are included here because some CD-ROM drives may not be able to recognise the pointers in the pre-gap area PG. When the unrecoverable data UD is read, the data reading operation is aborted. The CD-ROM drive will then implement a recovery strategy, which includes reading from the position indicated by the data pointers DP. Hence, the player program is loaded automatically.

When the track is played by an audio CD player, the player starts to look for the track T at the position ATOC but also examines other control data, such as the P channel and the index IDX, to determine the start position of the track T. The player therefore starts to read the track from the time AP, thereby avoiding the encapsulating data ED and playing the track as a normal audio track.

By this method, a CD-ROM drive encounters an error in the data itself, rather than in the control information. The method cannot be circumvented simply by ignoring all data errors, because there may be unintentional data errors elsewhere on the CD which cannot be ignored.

A multifunction device which detects video CDs by looking for the files 'info.vcd' and 'entries.vcd' at a predetermined position on the compact disc will use the track index contained within those files; as the track index indicates the start position as AP, rather than ATOC, the encapsulating data ED is not read by the multifunction device.

Player Program

As described above, the CD contains both a Mac™ player program and a PC-compatible player program, each arranged so that it is only identified by the relevant filing system. The player program is designed to read the CD in the same manner as a DVD player, by reading the VCD index section VI at the predetermined position as described above. The player program does not attempt to read the encapsulating data ED. However, the player program is arranged to play the tracks only if a supervisory program, as described below, is running on the computer.

Supervisory Program

Preferably, a disc produced according to the embodiment contains software that is activated when the computer operating system first accesses the disc; this may be done automatically using an 'autorun' function of the operating system. The software may comprise visible, hidden, or a combination of visible and hidden files on the disc. The software may comprise multiple files, packaged into a single package file.

The software may conceal critical registry entries by deploying filters within the host operating system. This makes it difficult to inhibit the software by changing registry entries.

The software instantiates a memory resident supervisory program that monitors access to the protected disc. When the disc is removed, the supervisory program is removed from the memory of the PC. The supervisory program is also designed to monitor the activity of the disc, including disc speed and disc access type (digital or audio) and to ensure reliable playback of the disc content.

Figure 2A:
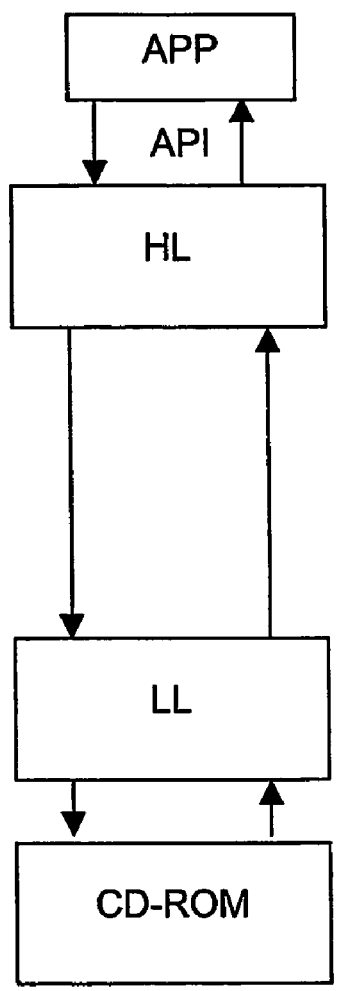
FIG. 2a is a diagram of a driver chain between an application and a CD-ROM drive.
Figure 2B:
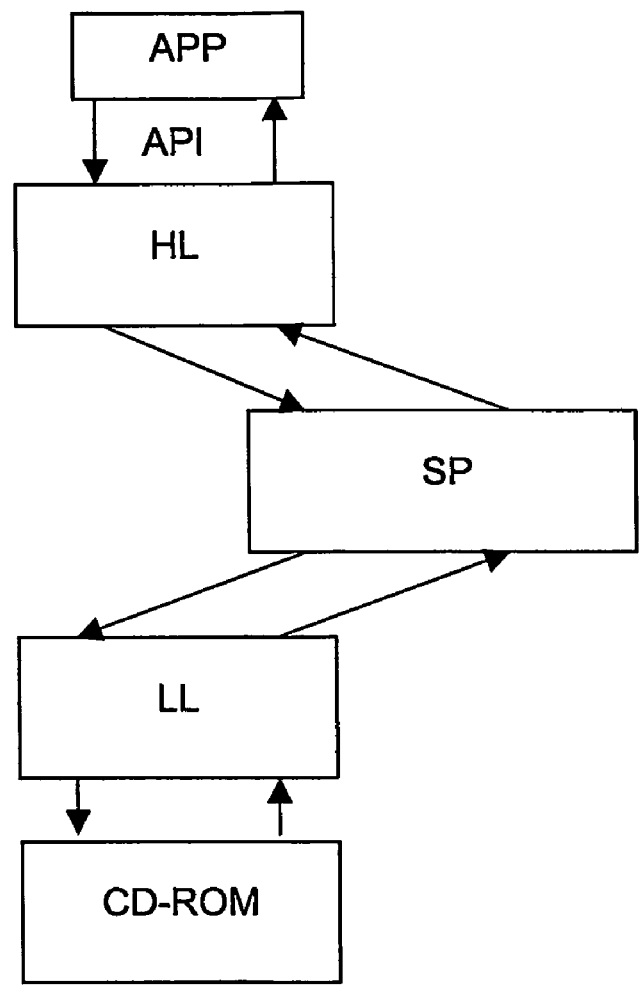
FIG. 2b is a diagram showing the insertion of a supervisory program in the driver chain.

The supervisory program inserts itself or part of itself into the operating system driver chain. As illustrated in FIG. 2b, a driver chain is a computer operating system feature, where an application APP communicates with a higher level HL of the chain. This higher level HL communicates with a lower level LL which communicates with the CD-ROM drive. The driver chain presents a standard application program interface API to the application program APP for communicating with a large variety of hardware devices. As shown in FIG. 2b, the supervisory program SP inserts itself into this driver chain by modifying the chain pointers in the next highest and lowest levels, and can therefore monitor all communications from the application program APP to the CD-ROM drive. The supervisory program SP performs command monitoring and disc monitoring functions.

Command Monitoring

The command monitoring function intercepts commands, such as SCSI or ATAPI commands, sent by the application APP to the CD-ROM drive and determines whether the commands indicate an unauthorised activity, such as the reading of data from the disc by an application that is not the player program. If an unauthorised activity is detected, the relevant command is blocked by the supervisory program and cannot continue down the driver chain to the CD-ROM. A command response is generated by the supervisory program and is returned up the driver chain to the application. The response may be an error message or dummy data, which appear to have originated from the CD-ROM drive, and prevent the application from performing the desired operation.

Alternatively, the command monitoring function may pass a read command to the disc, but may corrupt the data read from the disc if the read operation is not authorised, so that the application receives corrupt data.

Command Proxy

The command monitoring function is able to handle non-standard commands, referred to as 'Command Proxies', sent by the application to the drive. Command proxies are not recognisable by the drive and are only used by authorised applications. The codes for command proxies may be kept secret, so that unauthorised applications cannot be programmed to use them.

Figure 3A:
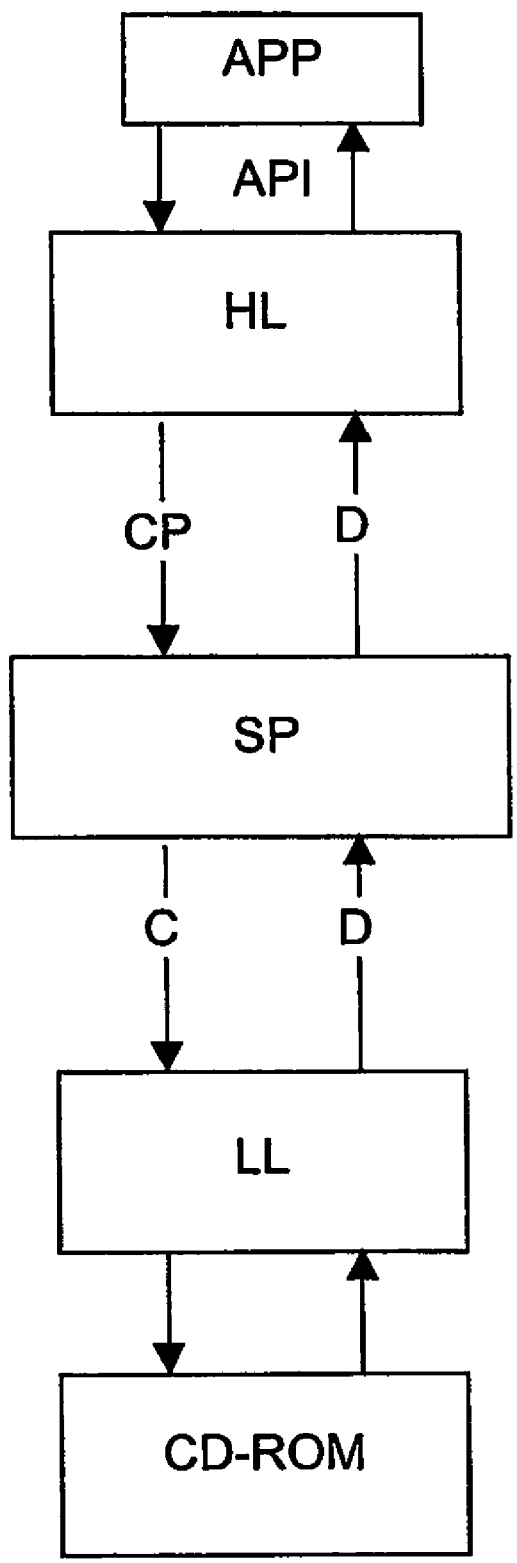
FIG. 3a is a diagram showing the action of a command proxy function in the supervisory program when receiving a command proxy from a higher layer.

As shown in FIG. 3a, when the command monitoring function of the supervisory program SP receives a command proxy CP, it alters the command proxy to a standard drive command and passes the standard command C on to the drive. The drive processes this command as normal and returns the result D to the supervisory program SP, which generates a corresponding result D to send to the application program APP. For example, a 'read' command proxy CP causes the command monitoring program to send a standard read command C to the drive. The drive returns the read data D which is passed on to the application program.

Figure 3B:
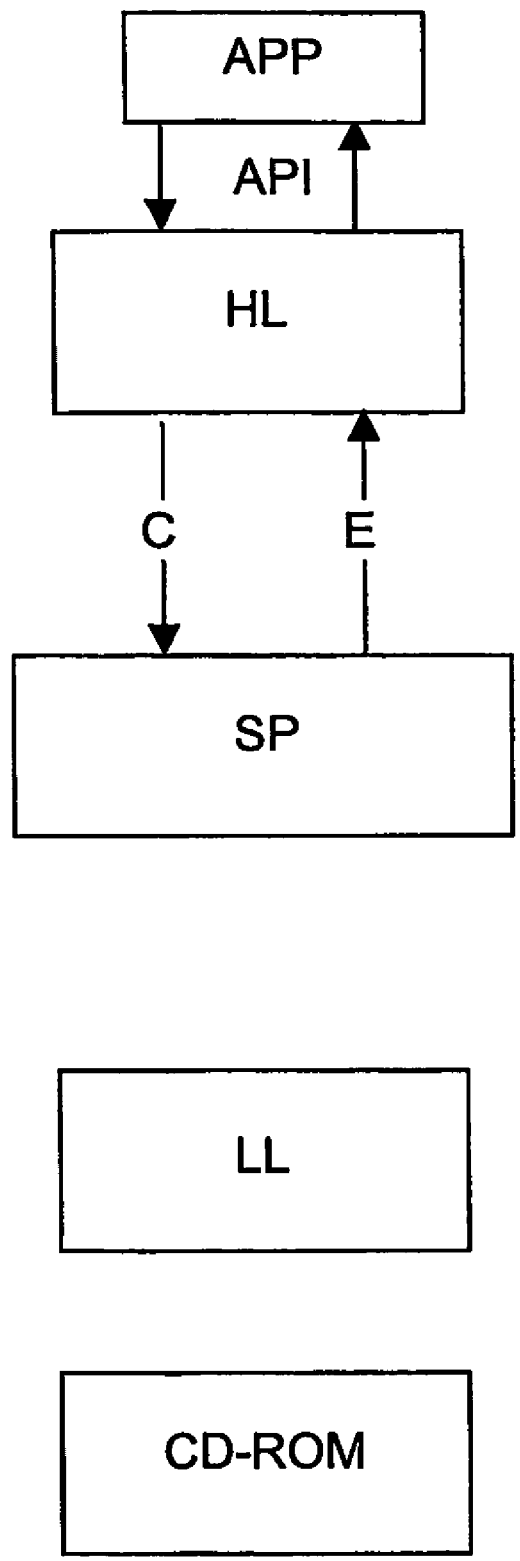
FIG. 3b is a diagram showing the action of a command proxy function in the supervisory program when receiving a standard command from the higher layer.

Conversely, as shown in FIG. 3b, the command monitoring function of the supervisory program SP blocks standard commands, which are recognisable by the drive, received from an application program. For example, when the normal read command C is used, its operation is blocked by the command monitoring program, and an error message E may be returned.

In a more specific example, the commands C are standard SCSI commands such as defined in draft standard ANSI T10 MMC and the SCSI Primary Commands standards SCP-2 and SCP-3. Both SCSI and ATAPI drives use the standard SCSI command set. The command proxies CP conform with the SCSI command standard, except that their command codes do not have any standard meaning and are therefore not recognisable by drives conforming to the SCP standards. However, the command monitoring function accesses a conversion table that converts command proxies CP to standard commands C, and is therefore able to recognise command proxies CP and send equivalent standard commands to the drive.

Disc Monitoring

The disc monitoring functions involve monitoring data read by the CD-ROM and passed along the driver chain to the application. If unauthorised activity is detected, the read operation is prevented.

The supervisory program SP may, for example calculate the average data transfer rate, disc speed or the type of read operation that is being attempted. When a disc is being played in a computer using the player program, the average data reading speed of the disc will be approximately the same as the speed at which the player program plays the data. The data may read from the disc in blocks at a high speed (burst speed), followed by a much longer period of inactivity. The burst speed could in fact be anything up to and including the maximum read speed of the CD-ROM drive, but for very short periods. On the other hand, CD copying software typically will try to copy at the highest speed possible for a sustained period. The supervisory program monitors the average data reading speed over a predetermined period, such as ten seconds. If the average speed exceeds a threshold, then the read operation is prevented.

The supervisory program may monitor the position of the read head of the CD-ROM and compare the position to a range of positions that the player program should not need to access. If a position within that range of positions is being accessed, the supervisory program prevents the read operation. For example, the player program should not attempt to read the encapsulating data, so the range of positions may include the positions of the encapsulating data ED. If the supervisory program detects that the player program is running but the encapsulating data is being read, then the reading operation is inhibited. The read operation may be prevented by blocking the data from reaching the application, and returning an error message, dummy data or corrupt data as described above. The supervisory program may shut down the unauthorised application. An eject command may also be sent to the CD-ROM.

The supervisory program interacts with the player program to prevent unauthorised activities. If the player program is not open, or is closed by the user while the disc is still in the CD-ROM drive, then the supervisory program sends an eject command to the CD-ROM drive. Likewise, if a protected disc is no longer present in the CD-ROM drive, the supervisory program closes itself down.

The supervisory program may comprise multiple program components, each of which checks for the presence of some or all of the other components and restores any of the other components which have been removed or corrupted. This makes it very difficult for the supervisory program to be removed in an unauthorised manner.

Where there is more than one protected disc accessible to the computer at the same time in different drives, the supervisory program, when launched by the insertion of a protected disc, determines whether there is another instance of itself already running. If so, the drive containing the new disc is added to a list of drives monitored by the other instance. If not, the new instance of the supervisory program is deployed. Once all of the monitored drives no longer contain a protected disc, the supervisory program removes itself from the system.

In general, the supervisory program is designed to detect any access to a protected disc other than the player program accessing the disc. If the disc is accessed in any other way the activity will be judged illegal and interventionary action will be taken by the supervisory program. The supervisory program identifies a protected disc by recognising a signature which forms part of the disc format structure, and does not prevent the copying of an ordinary disc or interfere with the general performance and/or activities of the computer.

CD Production

Figure 4:
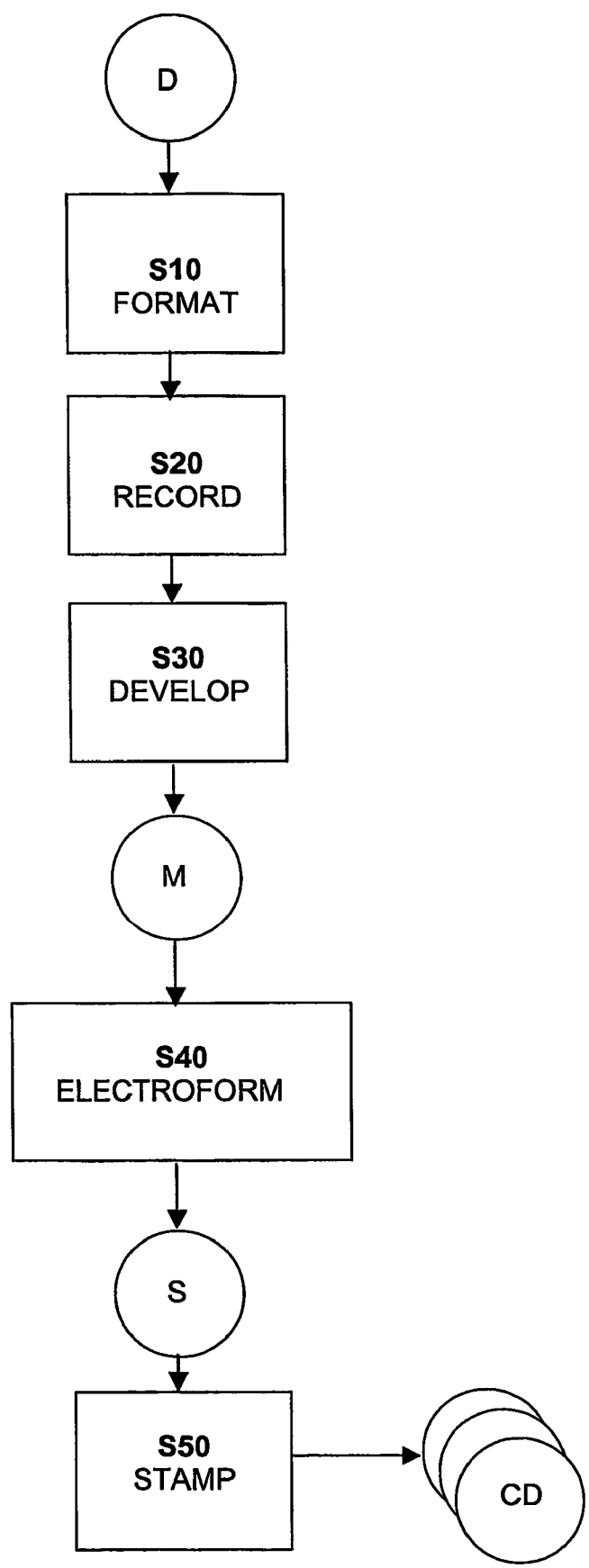
FIG. 4 is diagram illustrating the stages of manufacture of a compact disc according to the embodiment.

To produce a CD formatted according to an embodiment of the invention requires special software to be used during the mastering process, which is illustrated in FIG. 4. The source data D for one or more tracks is provided on a carrier, which may itself be a recordable CD or a digital tape. The source data is formatted (S10) by software to generate a session and associated data in the format described above, for recording on the CD. The formatted data is recorded (S20) on a CD master, using for example a laser beam recorder which writes the data on a coated glass master. The glass master is developed (S30) to produce a metallized glass master M. The master may be used to produce one or more stampers S by an electroforming process (S40). CDs are mass-produced from the stamper S by a stamping process (S50). In an alternative embodiment suitable for low volume production, recordable CD's may be recorded directly with the formatted data.

The formatted data may be recorded as a data set for input to the recorder at a subsequent time.

Embodiments of the invention include CD production software for formatting data and/or controlling a recording process to generate one or more CD's having a format in accordance with an embodiment of the invention. Embodiments also include formatted data having a structure as defined above.

The above embodiments are provided purely by way of example. Alternatives, which may be apparent to the skilled person on reading the specification, may nevertheless fall within the invention as defined by the claims.

The invention claimed is:

1. An optical disc carrying a session including a table of contents and a program area containing at least one track, the table of contents indicating a first start position, wherein:
   a. a data portion is located at said first start position and is arranged to cause a read failure by a first optical disc reader, which reads at said first start position;
   b. the track is located at a second start position different from said first start position; and
   c. the session further includes an index indicating said second start position, such that a second optical disc reader is enabled to read the track by reading the second start position from the index.

2. An optical disc according to claim 1, wherein the index is a video CD index and said second optical disc reader is a video CD compatible optical disc reader.

3. An optical disc according to claim 1, wherein the index is located at a predetermined position within the session, such that it is recognised by the second optical disc reader.

4. An optical disc according to claim 1, wherein the program area includes one or more subchannels arranged to cause a third optical disc reader to read the track and to ignore the data portion.

5. An optical disc according to claim 4, wherein the one or more subchannels are arranged to cause the third optical disc reader to ignore the index.

6. An optical disc according to claim 4, wherein the third optical disc reader is an audio CD player, and the track is an audio track.

7. An optical disc according to claim 1, wherein the data portion includes unrecoverable data arranged to cause a read error in the first optical disc reader.

8. An optical disc according to claim 1, wherein the data portion includes a pointer to a player program executable by the first optical disc reader to play the track.

9. An optical disc according to claim 8, wherein the pointer indicates a position on the optical disc at which the player program is stored.

10. An optical disc according to claim 8, wherein the data portion is arranged to cause the first optical disc reader to execute the player program.

11. An optical disc according to claim 8, wherein the player program is arranged to restrict copying of the track by the first optical disc reader.

12. An optical disc according to claim 1, including a boot sector arranged to cause a third optical disc player to execute a player program when the optical disc is loaded into the third optical disc player.

13. An optical disc according to claim 12, wherein the player program is arranged to restrict copying of the track by the third optical disc player.

14. An optical disc according to claim 12, wherein the player program is stored on the optical disc at a position indicated by the boot sector.

15. An optical disc according to claim 1, further including a supervisory program arranged to be executed by the first optical disc player when the optical disc is loaded therein, the supervisory program being arranged selectively to prevent access to the optical disc by the first optical disc player.

16. An optical disc according to claim 1, wherein the track is able to be copied to another carrier via the first optical disc reader.

17. An optical disc according to claim 1, wherein the track is unable to be copied by the second optical disc reader to another carrier.

18. An optical disc according to claim 1, wherein the program is unable to be loaded and executed by the second optical disc reader.

19. A method of manufacturing an optical disc, the method comprising:
  formatting source data to create a session including a table of contents and a program area containing at least one track, the table of contents indicating a track start position; and
  recording the formatted source data on the optical disc, wherein:
  a. a data portion is located at said first start position and is arranged to cause a read failure by a first optical disc reader, which reads at said first start position;
  b. the track is located at a second start position different from said first start position; and
  c. the session further includes an index indicating said second start position, such that a second optical disc reader is enabled to read the track by reading the second start position from the index.

20. A method according to claim 19, wherein the index is a video CD index and said second optical disc reader is a video CD compatible optical disc player.

21. A method according to claim 19, wherein the index is located at a predetermined position within the session, such that it is recognised by the second optical disc reader.

22. A method according to claim 19, wherein the program area includes one or more subchannels arranged to cause a third optical disc reader to play the track and to ignore the data portion.

23. A method according to claim 22, wherein the one or more subchannels are arranged to cause the third optical disc reader to ignore the index.

24. A method according to claim 19, wherein the third optical disc reader is an audio CD player, and the track is an audio track.

25. A method according to claim 19, wherein the data portion includes unrecoverable data arranged to cause a read error in the first optical disc reader.

26. A method according to claim 19, wherein the data portion includes a pointer to a player program executable by the first optical disc reader to play the payload.

27. A method according to claim 26, further including recording the player program on the optical disc, wherein the pointer indicates a position on the optical disc at which the player program is recorded.

28. A method according to claim 26, wherein the data portion is arranged to cause the first optical disc reader to execute the player program.

29. A method according to claim 26, wherein the player program is arranged to restrict copying of the track by the first optical disc reader.

30. A method according to claim 19, including recording on the optical disc a boot sector arranged to cause a third optical disc player to execute a player program when the optical disc is loaded into the third optical disc player.

31. A method according to claim 30, wherein the player program is arranged to restrict copying of the track by the third optical disc player.

32. An optical disc according to claim 30, including recording the player program on the optical disc at a position indicated by the boot sector.

33. A method according to claim 19, wherein the track is able to be copied to another carrier via the first optical disc reader.

34. A method according to claim 19, wherein the track is unable to be copied by the second optical disc reader to another carrier.

35. A method according to claim 19, wherein the program is unable to be loaded and executed by the second optical disc reader.

36. A method according to claim 19, wherein the optical disc is an optical disc master.

37. A method according to claim 36, including manufacturing one or more playable optical discs directly or indirectly from the optical disc master.

38. A non-transitory computer readable medium including a computer-executable program stored therein, said computer-executable program including program steps for performing the method of claim 19.

* * * * *